US009987856B2

(12) United States Patent
Sawamura et al.

(10) Patent No.: US 9,987,856 B2
(45) Date of Patent: Jun. 5, 2018

(54) IMAGE RECORDING APPARATUS AND IMAGE RECORDING METHOD

(71) Applicants: Ichiro Sawamura, Shizuoka (JP); Yoshihiko Hotta, Shizuoka (JP); Kazuyuki Uetake, Shizuoka (JP); Takahiro Furukawa, Kanagawa (JP); Tomomi Ishimi, Shizuoka (JP); Yasuroh Yokota, Shizuoka (JP)

(72) Inventors: Ichiro Sawamura, Shizuoka (JP); Yoshihiko Hotta, Shizuoka (JP); Kazuyuki Uetake, Shizuoka (JP); Takahiro Furukawa, Kanagawa (JP); Tomomi Ishimi, Shizuoka (JP); Yasuroh Yokota, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days. days.

(21) Appl. No.: 15/421,492

(22) Filed: Feb. 1, 2017

(65) Prior Publication Data

US 2017/0225487 A1 Aug. 10, 2017

(30) Foreign Application Priority Data

Feb. 5, 2016 (JP) ................................ 2016-021350
Jan. 25, 2017 (JP) ................................ 2017-011473

(51) Int. Cl.

*H04N 1/40* (2006.01)
*B41J 2/455* (2006.01)
*B41J 3/407* (2006.01)

(52) U.S. Cl.

CPC ............. *B41J 2/455* (2013.01); *B41J 3/4073* (2013.01)

(58) Field of Classification Search

None
See application file for complete search history.

(56) References Cited

U.S. PATENT DOCUMENTS

| | | | |
|---|---|---|---|
| 5,808,655 | A | 9/1998 | Haas et al. |
| 2008/0011854 | A1 | 1/2008 | Idaka |

(Continued)

FOREIGN PATENT DOCUMENTS

| | | |
|---|---|---|
| CN | 103974832 A | 8/2014 |
| JP | 09-020023 | 1/1997 |

(Continued)

OTHER PUBLICATIONS

Feb. 14, 2018 Chinese official action (and English translation thereof) in connection with corresponding Chinese patent application No. 201710057165.6.

*Primary Examiner* — Alejandro Valencia
(74) *Attorney, Agent, or Firm* — Cooper & Dunham LLP

(57) ABSTRACT

An image recording apparatus includes: a laser irradiation device including a plurality of laser output sections arranged side by side in a certain direction and configured to irradiate positions different from one another in the certain direction with laser light output from the plurality of laser output sections, the image recording apparatus being configured to irradiate a recording target moving relatively to the laser irradiation device in a relative movement direction different from the certain direction, with laser light to heat the recording target, and record a visible image on the recording target; and an image correction unit configured to adjust an irradiation condition of the laser light output from the plurality of laser output sections and correct distortion of an image recorded on a recording surface of the recording target based on a shape of the recording surface.

19 Claims, 12 Drawing Sheets

(56) References Cited

U.S. PATENT DOCUMENTS

| | | | | |
|---|---|---|---|---|
| 2011/0090299 | A1 | 4/2011 | Asai et al. | |
| 2014/0285606 | A1* | 9/2014 | Ishimi | B41M 7/0009 347/179 |

FOREIGN PATENT DOCUMENTS

| | | |
|---|---|---|
| JP | 2008-006468 | 1/2008 |
| JP | 2008-068312 | 3/2008 |
| JP | 2010-052350 | 3/2010 |
| JP | 2011-104994 | 6/2011 |
| JP | 5132900 | 11/2012 |
| JP | 5095962 | 12/2012 |

* cited by examiner

IMAGE RECORDING APPARATUS AND IMAGE RECORDING METHOD

CROSS-REFERENCE TO RELATED APPLICATIONS

The present application claims priority under 35 U.S.C. § 119 to Japanese Patent Application No. 2016-021350, filed Feb. 5, 2016 and Japanese Patent Application No. 2017-011473, filed Jan. 25, 2017. The contents of which are incorporated herein by reference in their entirety.

BACKGROUND OF THE INVENTION

1. Field of the Invention

The present invention relates to an image recording apparatus and an image recording method.

2. Description of the Related Art

Image recording apparatuses that irradiate recording targets with lasers to heat the recording targets and record visible images on the recording targets have been known.

Japanese Unexamined Patent Application Publication No. 2010-52350 describes an image recording apparatus provided with a laser irradiation device such as a laser array that includes a plurality of semiconductor lasers serving as laser light emitting elements arranged in an array and irradiates positions different from one another in a certain direction with laser light emitted from the respective semiconductor lasers, for example. The image recording apparatus in Japanese Unexamined Patent Application Publication No. 2010-52350 irradiates a recording target with laser light to record a visible image on the recording target moving relatively to the laser irradiation device in a direction different from the certain direction.

As a method for recording an image on a curved surface, Japanese Unexamined Patent Application Publication No. 2008-06468 proposes a method in which laser light emitted from a single laser light emitting element is deflected by a galvano mirror, a focal position of laser light is adjusted by a Z-axis scanner for performing image and optical corrections on a preset shape, and an image is recorded, for example. For another example, Japanese Unexamined Patent Application Publication No. 2008-68312 proposes a method in which image and optical corrections are performed on a preset shape on the basis of a distance detection result, and an image is recorded.

The image forming method using a single laser light emitting element can accurately record an image on a curved surface by performing an image angle correction with the galvano mirror and an optical correction with the Z-axis scanner on the curved surface. These corrections, however, cannot be utilized when a plurality of laser optical elements are used without laser light deflection scanning.

There is a problem in that an image recorded on a recording surface is distorted when the recording surface is a curved surface such as a case where the recording target has a cylindrical shape and the image is recorded on a side surface of the cylindrically shaped recording target.

SUMMARY OF THE INVENTION

According to an aspect of the present invention, an image recording apparatus includes a laser irradiation device and an image correction unit. The laser irradiation device includes a plurality of laser output sections arranged side by side in a certain direction and is configured to irradiate positions different from one another in the certain direction with laser light output from the plurality of laser output sections, the image recording apparatus being configured to irradiate a recording target moving relatively to the laser irradiation device in a relative movement direction different from the certain direction, with laser light to heat the recording target, and record a visible image on the recording target. The image correction unit is configured to adjust an irradiation condition of the laser light output from the plurality of laser output sections and correct distortion of an image recorded on a recording surface of the recording target based on a shape of the recording surface.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENT

Figure 1:
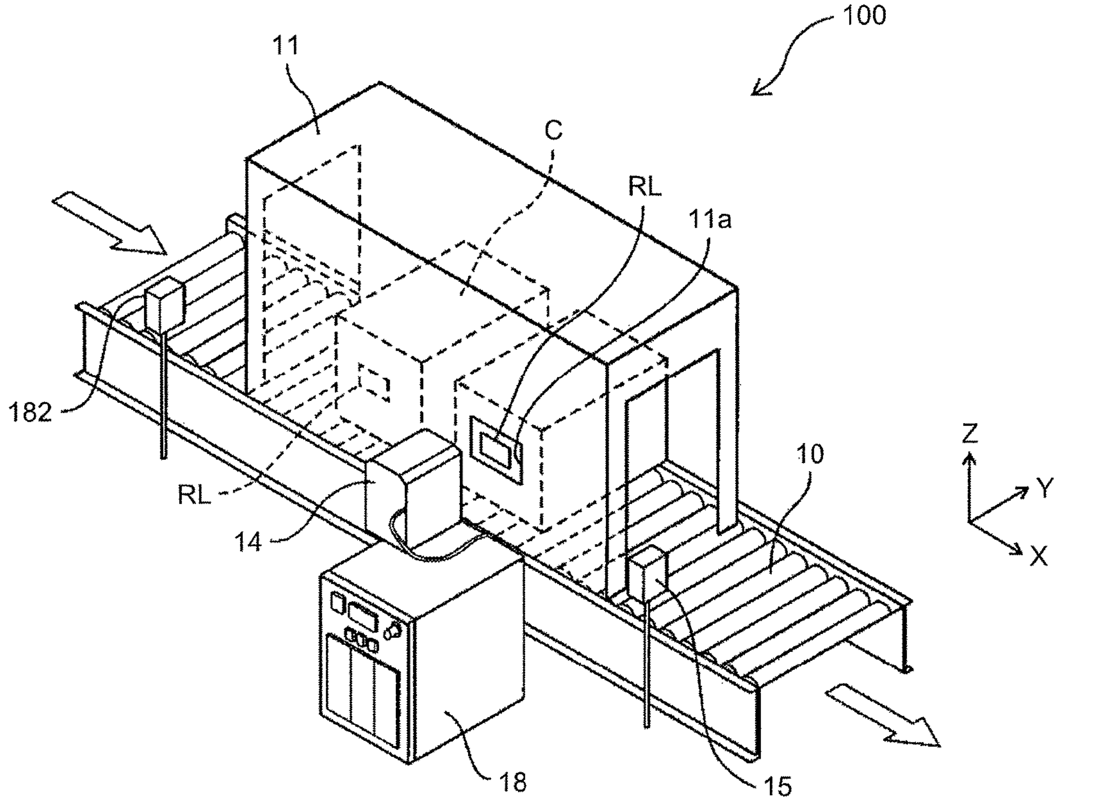
FIG. 1 is a schematic structural view of an image recording system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

The following describes an embodiment of an image recording apparatus to which the present invention is applied. The image recording apparatus irradiates a recording target with laser light to record an image on the recording target.

An embodiment has an object to provide an image recording apparatus and an image recording method capable of recording an image in which distortion is suppressed even if the recording target having a curved surface.

The image is not limited to any specific one as long as the image is visible information, and can be appropriately selected according to the purpose. Examples of the image include characters, symbols, lines, graphics, solid images, combinations thereof, and two-dimensional codes such as bar codes and QR codes (registered trademark).

The recording target is not limited to any specific one as long as recording can be performed using laser light, and can be appropriately selected according to the purpose. Any recording target that absorbs light and converts light into heat to form an image is usable as the recording target. A metal, on which an engraved mark is formed, is an example of the recording target. A thermal recording medium and a structural body having a thermal recording section are also examples of the recording target.

The thermal recording medium has a supporter and an image recording layer on the supporter. If necessary, the thermal recording medium has other layers. Each of those layers has a single layer structure or a multiple-layer structure. Each layer may be formed on the other surface of the supporter.

Image Recording Layer

The image recording layer contains a leuco dye and a developer. If necessary, the image recording layer contains other components.

The leuco dye is not limited to a specific dye and can be appropriately selected from ones used for typical thermal recording materials according to the purpose. Lueco lueco compounds of dyes such as triphenylmethane, fluoran, phenothiazine, auramine, spiropyran, and indolinone phthalide dyes are preferably used, for example.

For the developer, various electron-accepting compounds or oxides that cause the leuco dye to develop a color when making contact with the leuco dye are applicable.

Examples of other components include binder resins, photothermal conversion materials, heat melting materials, antioxidants, light stabilizers, surfactants, lubricants, and loading materials.

Supporter

The supporter is not limited in shape, structure, and size, and can be appropriately selected according to the purpose. The shape is a planar shape, for example. The supporter may have a single layer structure or a multi-layer structure as the structure thereof. The size of the supporter may be appropriately selected in accordance with a size of the thermal recording medium, for example.

Other Layers

Examples of the other layers include a photothermal conversion layer, a protection layer, an under layer, an ultraviolet rays absorption layer, an oxygen blocking layer, an intermediate layer, a back layer, an adhesive layer, and a sticky agent layer.

The thermal recording medium can be formed in a desired shape according to the intended use.

Examples of the shape include a card shape, a tag shape, a label shape, a sheet shape, and a roll shape. Examples of the thermal recording medium formed in a card shape include a prepaid card, a reward card, and a credit card. The thermal recording medium formed in a tag shape having a size smaller than the card size can be used as a price tag, for example. The thermal recording medium formed in a tag shape having a size larger than the card size can be used for process management, a shipment instruction sheet, and a ticket, for example. The thermal recording medium formed in a label shape is formed in various sizes so as to be able to be attached and attached to wagons, vessels, boxes, and containers that are repeatedly used, for example, to use the thermal recording medium for process management, commodity management. or the like. The thermal recording medium formed in a sheet shape having a size larger than the card size has a large area in which images are recorded and thus can be used for a typical document and an instruction sheet for process management, for example.

Examples of the thermal recording section included in the structural body include a portion of a surface of the structural body to which the thermal recording medium having a label shape is attached and a portion of a surface of the structural body on which a thermal recording material is applied. The structural body having the thermal recording section is not limited to any specific structural body as long as the structural body has the thermal recording section on the surface thereof, and can be appropriately selected according to the purpose. Examples of the structural body having the thermal recording section include various commercial products such as vinyl bags, PET bottles, and cans, conveyance vessels such as cardboard boxes, and containers, products in progress, and industrial products.

The following describes an image recording apparatus that records an image on a structural body having a thermal recording section and serving as a recording target, specifically, a transportation container C that is the recording target and to which a thermal recording label is attached.

FIG. 1 is a schematic perspective view of an image recording system 100 serving as the image recording apparatus according to the embodiment. In the following description, a conveyance direction of the transportation container C is the X-axis direction, the up-down direction is the Z-axis direction, and a direction perpendicular to both of the conveyance direction and the up-down direction is the Y-axis direction.

As described in detail below, the image recording system 100 irradiates a thermal recording label RL attached to the transportation container C serving as the recording target with laser light to record an image on the thermal recording label RL.

As illustrated in FIG. 1, the image recording system 100 includes a conveyance device 10 serving as a recording target conveyance unit, a recording device 14, a system control device 18, a reading device 15, and a blocking cover 11.

The recording device 14 irradiates the thermal recording label RL with laser light to record a visible image on the recording target. The recording device 14 is disposed on a minus Y side of the conveyance device 10, i.e., on a minus Y side of a conveyance path.

The blocking cover 11 blocks laser light emitted from the recording device 14 so as to reduce scattering of laser light and has a surface coated with black alumite coating. The blocking cover 11 is provided with an opening 11*a* that allows the laser light to pass through the opening 11*a* at an area facing the recording device 14. In the embodiment, the conveyance device 10 is a roller conveyor. The conveyance device 10 may be a belt conveyor.

The system control device 18, to which the conveyance device 10, the recording device 14, the reading device 15, and the like are connected, controls the whole of the image recording system 100. The reading device 15 reads a code image such as the two-dimensional code including the bar code and the QR code recorded on the recording target, which is described later. The system control device 18 verifies whether the image is correctly recorded on the basis of the information read by the reading device 15.

The following describes the thermal recording label RL attached to the container C.

The thermal recording label RL is a thermal recording medium. Heat causes color tones thereof to change, thereby recording an image. In the embodiment, the thermal recording label RL is a one-time thermal recording medium that records an image only one time. For the thermal recording label RL, a heat reversible recording medium that is capable of performing a plurality of times of recording can be used.

The thermal recording medium used for the thermal recording label RL used in the embodiment includes a material (photothermal conversion material) that absorbs laser light and converts laser light into heat and a material having a hue and a reflection rate changed by heat.

The photothermal conversion materials are generally classified into inorganic materials and organic materials. Examples of the inorganic materials include particles of at least one of carbon blacks, metallic borides, and metallic oxides of Ge, Bi, In, Te, Se, and Cr, for example. As the inorganic materials, materials that largely absorb light in a near-infrared wavelength region and less absorb light in a visible wavelength region are preferable, and the metallic borides and the metallic oxides are preferable. As the inorganic material, it is preferable to select at least one from hexaboride compounds, tungsten oxide compounds, antimony tin oxide (ATO), indium tin oxide (ITO), and zinc antimonate.

Examples of hexaboride compounds include $LaB_6$, $CeB_6$, $PrB_6$, $NdB_6$, $GdB_6$, $TbB_6$, $DyB_6$, $HoB_6$, $YB_6$, $SmB_6$, $EuB_6$, $ErB_6$, $TmB_6$, $YbB_6$, $LuB_6$, $SrB_6$, $CaB_6$, and $(La,Ce)B_6$.

Examples of the tungsten oxide compounds include fine particles of tungsten oxides expressed by the general expression WyOz where W is tungsten, O is oxygen, and $2.2 \leq z/y \leq 2.999$, or fine particles of complex tungsten oxides expressed by the general expression MxWyOz where M is one or more elements selected from H, He, alkali metals, alkaline-earth metals, rare-earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, and $0.001 \leq x/y \leq 1$, and $2.2 \leq z/y \leq 3.0$, which are described in WO2005/037932 and Japanese Unexamined Patent Application Publication No. 2005-187323, for example.

Among these examples, cesium tungsten oxide is particularly preferable as the tungsten oxide compound because cesium tungsten oxide largely absorbs light in a near-infrared wavelength region and less absorbs light in a visible wavelength region.

Among antimony tin oxide (ATO), indium tin oxide (ITO), and zinc antimonate, ITO is particularly preferable as the tungsten oxide compound because ITO largely absorbs light in a near-infrared wavelength region and less absorbs light in a visible wavelength region. Those materials are formed in a layer by vapor deposition or adhesively bonding the particles thereof with a resin.

For the organic materials, various dyes can be appropriately used in accordance with a wavelength of light to be absorbed. When the semiconductor laser is used for the light source, a near-infrared absorption pigment having an absorption peak near 600 nm to 1200 nm is used. Specifically, examples of the organic materials include cyanine pigments, quinone series pigments, quinoline derivatives of indonaphthol, phenylenediamine nickel complexes, and phthalocyanine series pigments.

The photothermal conversion material may be singly used. Alternatively, two or more types of photothermal conversion materials may be used together. The photothermal conversion material may be disposed on the image recording layer or a layer other than the image recording layer. When the photothermal conversion material is disposed on a layer other than the image recording layer, the photothermal conversion layer is preferably provided adjacent to the heat reversible recording layer.

The photothermal conversion layer includes at least the photothermal conversion material and a binder resin.

For the material having a hue and a reflection rate changed by heat, a known material can be used such as a material containing a combination of an electron-donating dye precursor and an electron-accepting developer, which are used for conventional heat-sensitive paper, for example. The material having a hue and a reflection rate changed by heat includes material changed due to a complex reaction of heat and light, such as a discoloration reaction as a result of a solid-phase polymerization of diacetylene compounds by heat and ultraviolet-ray irradiation, for example.

Figure 2:
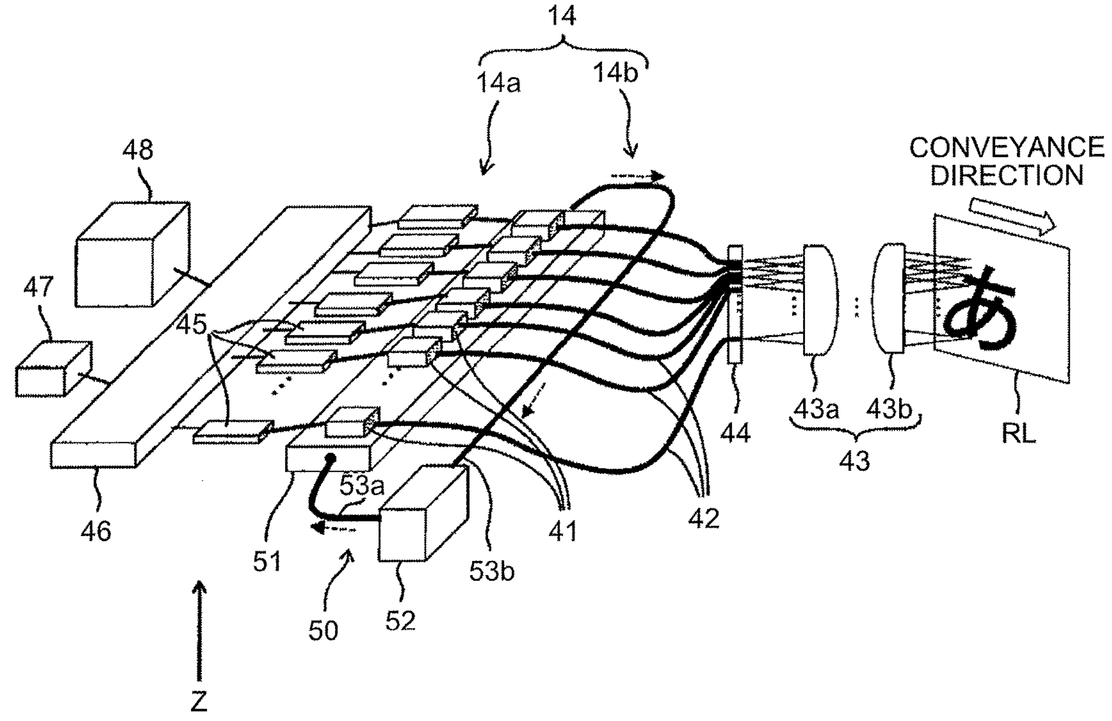
FIG. 2 is a schematic perspective view illustrating a structure of a recording device.

FIG. 2 is a schematic perspective view illustrating a structure of the recording device 14.

The embodiment uses, for the recording device 14, a fiber array recording device that records an image using a fiber array in which laser output sections of a plurality of optical fibers are arranged in an array in a main-scanning direction (Z-axis direction) perpendicular to a sub-scanning direction (X-axis direction) serving as the conveyance direction of the container C serving as the recording target. The fiber array recording device irradiates the recording target with laser light emitted from laser light emitting elements via the optical fiber array to record an image formed of drawing units. Specifically, the recording device 14 includes a laser array unit 14*a*, a fiber array unit 14*b*, and an optical unit 43. The laser array unit 14*a* includes a plurality of laser light emitting elements 41 arranged in an array, a cooling unit 50 that cools the laser light emitting elements 41, a plurality of drivers 45 each of which is disposed to correspond to one of the laser light emitting elements 41 and drives the corresponding laser light emitting element 41, and a controller 46 that controls the drivers 45. To the controller 46, a power source 48 that supplies power to the laser light emitting elements 41 and an image information output unit 47 that outputs image information, such as a personal computer, are connected.

Any laser can be appropriately selected for the laser light emitting element 41 according to the purpose. For example, the semiconductor laser, a solid laser, or a pigment laser can be used as the laser light emitting element 41. Among these examples, the semiconductor laser is preferably used as the laser light emitting element 41 because the semiconductor laser has a wide wavelength selectivity and a small size allowing the device to be downsized, and is capable of achieving a low price.

The wavelength of laser light emitted by the laser light emitting element 41 is not limited to any specific wavelength and can be appropriately selected according to the purpose. The wavelength is preferably 700 nm to 2000 nm, and more preferably 780 nm to 1600 nm.

The cooling unit 50 employs a liquid cooling method that circulates a liquid coolant to cool the laser light emitting elements 41. The cooling unit 50 includes a heat receiving section 51 where the liquid coolant receives heat from the respective laser light emitting elements 41 and a heat dissipation section 52 that releases heat of the liquid coolant. The heat receiving section 51 and the heat dissipation section 52 are coupled with cooling pipes 53*a* and 53*b*. The heat receiving section 51 includes a case formed with a good thermal conductive material. Inside the case, a cooling tube that is made of a good thermal conductive material and in which the liquid coolant flows is provided. The laser light emitting elements 41 are arranged in an array on the heat receiving section 51.

Generally, the cooling unit often employs a chiller method. In the chiller method, only cooling is performed without performing heating. The temperature of the laser light source does not become higher than a set temperature of the chiller. The temperatures of the cooling unit 50 and the laser light emitting elements 41 that are the laser light source in contact with the cooling unit 50 vary beyond an environmental temperature. When the semiconductor laser is used for the laser light emitting elements 41, a phenomenon occurs in which laser output varies depending on the temperature of the laser light emitting elements 41 (when the temperature of the laser light emitting elements 41 becomes low, the laser output increases). It is, thus, necessary for forming an image normally to measure the temperature of the laser light emitting elements 41 or the cooling unit 50 to control a signal input to the drivers 45 controlling the laser output such that the laser output becomes constant in accordance with the measurement result.

The heat dissipation section 52 includes a radiator and a pump that circulates the liquid coolant. The liquid coolant pumped by the pump of the heat dissipation section 52 flows in the heat receiving section 51 after passing through the cooling pipe 53*a*. The liquid coolant absorbs heat of the laser light emitting elements 41 arranged on the heat receiving section 51 while flowing in the cooling tube inside the heat receiving section 51 to cool the laser light emitting elements 41. The liquid coolant the temperature of which is increased due to the absorption of heat of the laser light emitting elements 41 flows out from the heat receiving section 51 and flows in the radiator of the heat dissipation section 52 after flowing in the cooling pipe 53*b*. As a result, the liquid coolant is cooled by the radiator. The liquid coolant cooled by the radiator is pumped to the heat receiving section 51 again by the pump.

The fiber array unit 14*b* includes a plurality of optical fibers 42 each provided to correspond to one of the laser light emitting elements 41 and an array head 44 that holds a portion near laser output sections 42*a* (refer to FIG. 3B) of the optical fibers 42 in the up down direction (Z-axis direction) such that the laser output sections 42*a* are arranged in an array. A laser incident section of each of the optical fibers 42 is attached to a laser output surface of the corresponding laser light emitting element 41.

Figure 3A:
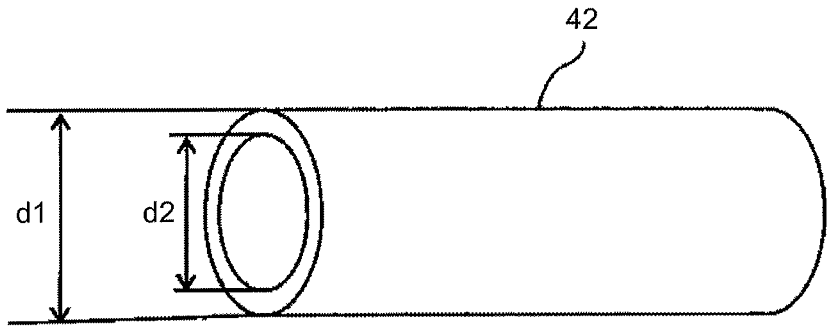
FIG. 3A is an enlarged schematic view of an optical fiber.
Figure 3B:
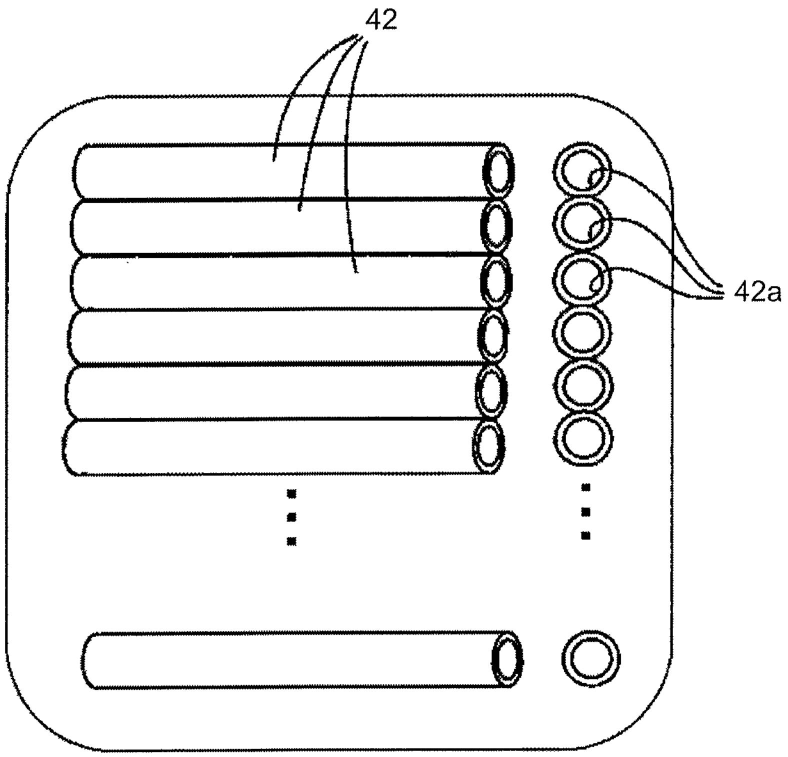
FIG. 3B is an enlarged view of the vicinity of an array head.

FIG. 3A is a schematic enlarged view of the optical fiber 42. FIG. 3B is an enlarged view of the vicinity of the array head 44.

The optical fiber 42 is an optical waveguide of laser light emitted from the laser light emitting element 41. The optical fiber 42 is not particularly limited in shape, size (diameter), material, and structure, and can be appropriately selected according to the purpose.

The size (a diameter d1) of the optical fiber 42 is preferably equal to or larger than 15 μm and equal to or smaller than 1000 μm. The optical fiber 42 having a diameter d1 equal to or larger than 15 μm and equal to or smaller than 1000 μm is advantageous for recording a fine image. In the embodiment, an optical fiber having a diameter of 125 μm is used as the optical fiber 42.

The material of the optical fiber 41 is not limited to any specific material, and can be appropriately selected according to the purpose. Examples of the material include a glass, a resin, and quartz.

The optical fiber 42 preferably has a structure including a core that is provided at the central portion thereof and allows laser light to pass through the core, and a clad layer provided on the outer periphery of the core.

A diameter d2 of the core is not limited to any specific diameter, and can be appropriately selected according to the purpose. The diameter d2 is preferably equal to or larger than 10 μm and equal to or smaller than 500 μm. The embodiment uses optical fibers each having a core diameter d2 of 105 μm. The material of the core is not limited to any specific material, and can be appropriately selected according to the purpose. Examples of the material include a glass doped with germanium or phosphorus.

An average thickness of the clad layer is not limited to any specific thickness, and can be appropriately selected according to the purpose. The average thickness of the clad layer is preferably equal to or larger than 10 μm and equal to or smaller than 250 μm. The material of the clad layer is not limited to any specific material, and can be appropriately selected according to the purpose. Examples of the material of the clad layer include a glass doped with boron or fluorine.

As illustrated in FIG. 3B, the array head 44 holds the portions, in the vicinity of the laser output sections 42*a*, of the optical fibers such that the laser output sections 42*a* are arranged in a array and a pitch between the laser output sections 42*a* of the optical fibers is 127 μm. In order to make it possible to record an image having a resolution of 200 dpi, the pitch between the laser output sections 42*a* is set to 127 μm.

When all of the optical fibers 42 are intended to be held by a single array head 44, the array head 44 needs to have a long length, and thus is easily deformed. As a result, it is difficult to keep a beam arrangement straight and beam pitches equal in the case of the single array head 44. The array heads 44, thus, is each configured to hold 100 to 200 optical fibers 42. In addition, a plurality of array heads 44 each holding 100 to 200 optical fibers 42 are preferably arranged side by side in the Z-axis direction which is the direction perpendicular to the conveyance direction of the container C in the recording device 14. In the embodiment, 100 array heads 44 are arranged side by side in the Z-axis direction.

FIGS. 4A to 4D are schematic views illustrating exemplary arrangements of the array heads 44.

Figure 4A:
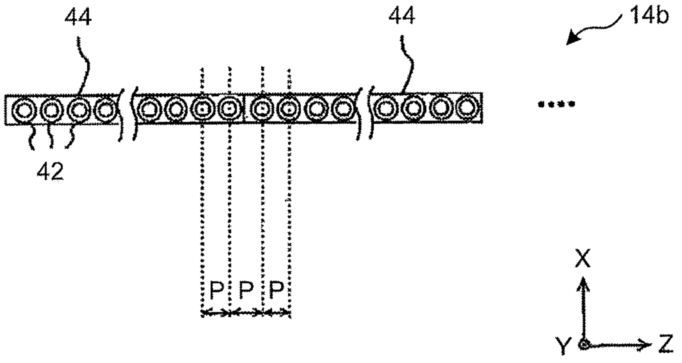
FIGS. 4A to 4D are schematic views illustrating exemplary arrangements of the array head.
Figure 4B:
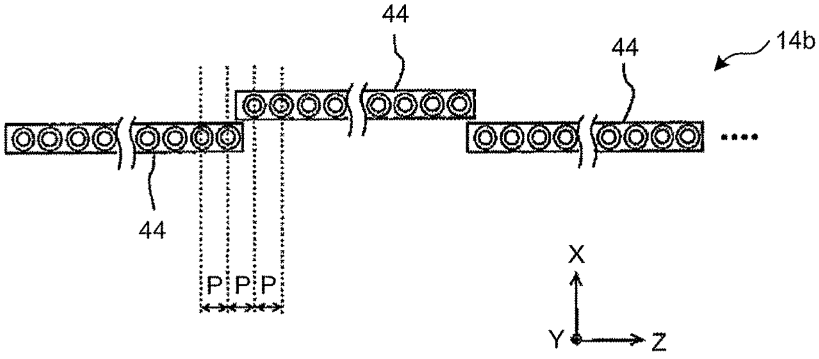

FIG. 4A illustrates an example in which the array heads 44 are arranged in an array in the Z-axis direction. FIG. 4B illustrates an example in which the array heads 44 are arranged in a zigzag pattern in the Z-axis direction.

As the arrangement of the array heads 44, the arrangement in a zigzag pattern as illustrated in FIG. 4B is more preferable than the arrangement in a straight-line manner in the Z-axis direction as illustrated in FIG. 4A from a point of view of ease of assembly.

Figure 4C:
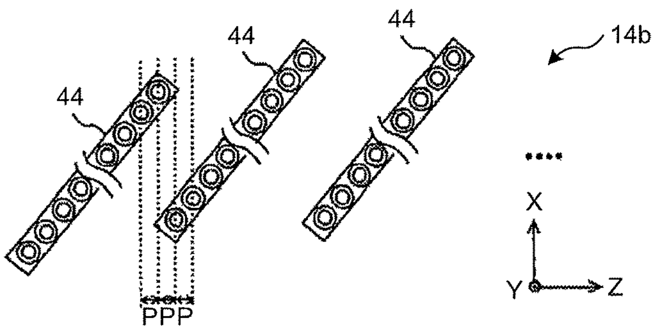

FIG. 4C illustrates an example in which the array heads 44 are arranged to tilt in the X-axis direction. The arrangement illustrated in FIG. 4C allows a pitch P between the optical fibers 42 in the array heads 44 in the Z-axis direction to be more reduced than in the arrangements illustrated in FIGS. 4A and 4B, thereby making it possible to achieve a high resolution.

Figure 4D:
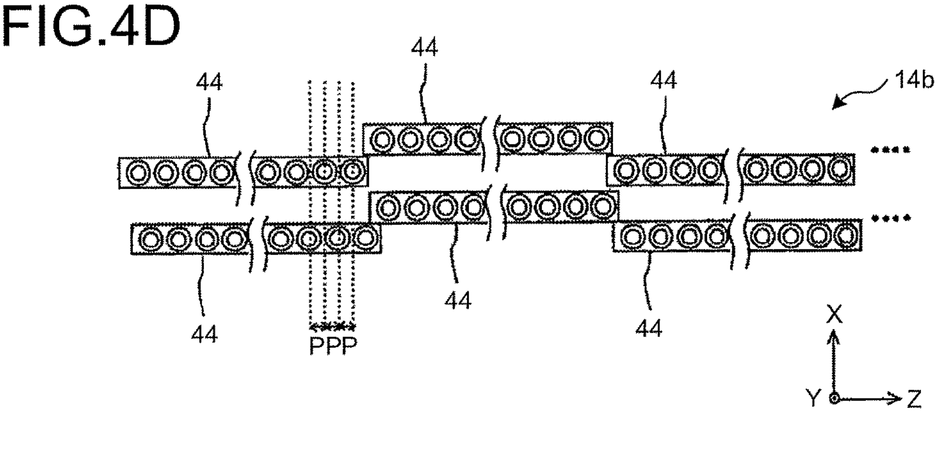

FIG. 4D illustrates an example in which two array head groups each including the array heads 44 are arranged in a zigzag pattern in the sub-scanning direction (the X-axis direction), and one array head group may be disposed such that the one array head group is shifted with respect to the other head array group by half of an arrangement pitch of the optical fibers 42 of the array head 44 in the main-scanning direction (the Z-axis direction). The arrangement illustrated in FIG. 4D also allows the pitch P between the optical fibers 42 in the array heads 44 in the Z-axis direction to be more reduced than in the arrangements illustrated in FIGS. 4A and 4B, thereby making it possible to achieve a high resolution.

As illustrated in FIG. 2, the optical unit 43 includes a collimator lens 43*a* that converts laser light, which is a scattered light flux, emitted from the respective optical fibers 42, into a parallel light flux and a condenser lens 43*b* that converges laser light on a surface, which serves as a laser irradiation surface, of the thermal recording label RL. Whether the optical unit 43 is provided may be selected according to the purpose.

The image information output unit 47, such as a personal computer, inputs the image data to the controller 46. The controller 46 produces driving signals for driving the respective drivers 45 on the basis of the input image data. The controller 46 transmits the produced driving signals to the respective drivers 45. Specifically, the controller 46 includes a clock generator. The controller 46 transmits the driving signals for driving the respective drivers 45 to the respective drivers 45 when the number of clocks generated by the clock generator reaches the specified number of clocks.

When receiving the driving signal, each driver 45 drives the corresponding laser light emitting element 41. The laser light emitting element 41 emits laser light in accordance with the drive from the 45. The laser light emitted from the laser light emitting element 41 enters the corresponding optical fiber 42 and is output from the laser output section 42*a* of the optical fiber 42. Laser light emitted from the laser output section 42*a* of the optical fiber 42 transmits through the collimator lens 43*a* and the condenser lens 43*b* of the optical unit 43, and thereafter reaches the surface of the thermal recording label RL of the container C serving as the recording target. The thermal recording label RL is heated by the laser light with which the surface of the thermal recording label RL is irradiated, and as a result, an image is recorded on the surface of the thermal recording label RL.

When a recording device that deflects laser light using the galvano mirror to record an image on the recording target is used, the recording target is irradiated with laser light deflected by the galvano mirror rotating to record an image such as a character such that laser light draws the image in a unicursal manner. When a certain amount of information is recorded on the recording target, this method has a problem in that the conveyance of the recording target needs to be stopped so as to perform recording in time. In contrast, when the laser array in which the laser light emitting elements 41 arranged in an array is used as in the recording device 14 in the embodiment, an image can be recorded on the recording target by performing ON/OFF control on the laser light emitting elements 41 each corresponding to one of the pixels. The recording device 14, thus, can record an image on the recording target without stopping the conveyance of the container C even when a large amount of information needs to be recorded. The recording device 14 according to the embodiment can record an image without reducing productivity even when a large amount of information is recorded.

As described later, the recording device 14 according to the embodiment emits laser light to heat the recording target to record an image on the recording target, and thus needs to use the laser light emitting element 41 having a certain high output level. As a result, the laser light emitting element 41 generates a large amount of heat. In a comparative laser recording device that does not include the fiber array unit 14*b*, the laser light emitting elements 41 need to be arranged in an array with a pitch according to resolution. Therefore, in the comparative laser recording device, in order to achieve a resolution of 200 dpi, the laser light emitting elements 41 need to be arranged with a very narrow pitch. As a result, in the comparative laser recording device, heat of the laser light emitting elements 41 is difficult to be released, and the temperature of the laser light emitting elements 41 becomes high. When the temperature of the laser light emitting elements 41 becomes high, the wavelengths and the optical outputs of the laser light emitting elements 41 fluctuate, thereby making it difficult to heat the recording target to a specified temperature, and to achieve a good image in the comparative laser recording device. In the comparative laser recording device, in order to reduce the increase in temperature of the laser light emitting elements 41, it is necessary to reduce the conveyance speed of the recording target and to widen light emission intervals of the laser light emitting elements 41, thereby making it impossible to enhance the productivity sufficiently.

By contrast, the recording device 14 according to the embodiment is a fiber array recording device that uses the fiber array unit 14*b*. The fiber array recording device allows the laser output sections 42*a* of the fiber array unit 14*b* to be arranged in accordance with the image resolution, and does not need to arrange the laser light emitting elements 41 of the laser array unit 14*a* with a pitch according to the image resolution. This structure makes it possible to widen a pitch between the laser light emitting elements 41 sufficiently such that heat of the laser light emitting elements 41 can be sufficiently released in the recording device 14 according to the embodiment. Thereby, in the recording device 14 according to the embodiment, it is possible to suppress the temperature of the laser light emitting elements 41 from becoming high, thereby making it possible to suppress the fluctuation of the wavelengths and light outputs of the laser light emitting elements 41. As a result, a good image can be recorded on the recording target in the recording device 14 according to the embodiment. In addition, the temperature increase in the laser light emitting elements 41 can be suppressed by shortening the light emission intervals of the laser light emitting elements 41. As a result, the conveyance speed of the container C can be increased. The productivity, thus, can be enhanced.

In the recording device 14 according to the embodiment, the cooling unit 50 cools the laser light emitting elements 41 by liquid, thereby making it possible to further reduce the temperature increase in the laser light emitting elements 41. As a result, in the recording device 14 according to the embodiment, the light emission intervals of the laser light emitting elements 41 can be further shorten, and thus the conveyance speed of the container C can be increased. The productivity, thus, can be enhanced. In the embodiment, the laser light emitting elements 41 are cooled by liquid. The laser light emitting elements 41 may be cooled by air using a cooling fan, for example. The liquid cooling has a higher cooling efficiency than the air cooling and thus has a merit of cooling the laser light emitting elements 41 well. Although the cooling efficiency of the air cooling is lower than of the liquid cooling, the air cooling has a merit of cooling the laser light emitting elements 41 at low cost.

Figure 5:
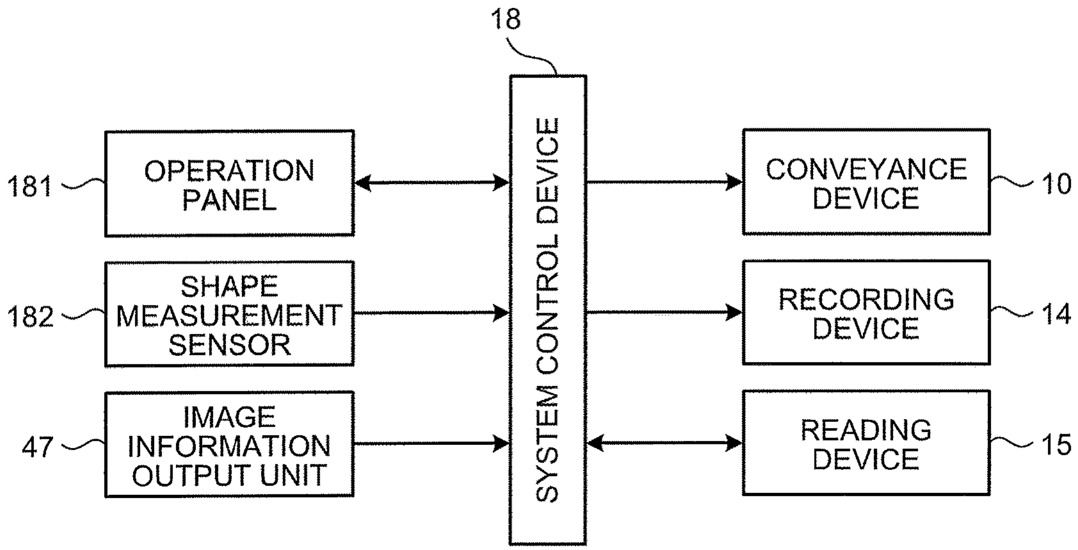
FIG. 5 is a block diagram illustrating a part of an electric circuit of the image recording system.

FIG. 5 is a block diagram illustrating a part of an electric circuit of the image recording system 100. The system control device 18 illustrated in FIG. 5 includes a central processing unit (CPU), a random access memory (RAM), a read only memory (ROM), and a non-volatile memory, controls the driving of various devices in the image recording system 100, and performs various types of arithmetic processing, for example. To the system control device 18, the conveyance device 10, the recording device 14, the reading device 15, an operation panel 181, and the image information output unit 47 are connected, for example.

The operation panel 181, which is provided with a touch panel display and various keys, displays an image and receives various types of information input by the operator's key operation, for example.

As illustrated in FIG. 5, the system control device 18 functions as an image correction unit as a result of the CPU operating in accordance with a program stored in the ROM, for example. The system control device 18 functioning as the image correction unit corrects distortion of an image recorded on a recording surface on the basis of a shape of the recording target.

The following describes an exemplary operation of the image recording system 100 with reference to FIG. 1. An operator places the container C that houses a load on the conveyance device 10. The operator places the container C on the conveyance device 10 such that a side surface, to which a thermal recording label is attached, of the container body is positioned on the minus Y side, i.e., the side surface faces the recording device 14.

Once the operator operates the operation panel 181 to start the system control device 18, a conveyance start signal is transmitted to the system control device 18 from the operation panel 181. When receiving the conveyance start signal, the system control device 18 starts driving the conveyance device 10. The container C placed on the conveyance device 10 is conveyed by the conveyance device 10 toward the recording device 14. The conveyance speed of the container C is 2 m/sec, for example.

Upstream of the recording device 14 in the conveyance direction of the container C, a sensor that detects the container C conveyed on the conveyance device 10 is disposed. When the sensor detects the container C, a detection signal is transmitted to the system control device 18 from the sensor. The system control device 18 includes a timer. The system control device 18 starts time measurement using the timer at timing at which the system control device 18 receives the detection signal from the sensor. The system control device 18 grasps timing at which the container C reaches the recording device 14 on the basis of an elapsed time from the timing of receiving the detection signal.

The system control device 18 outputs a recording start signal to the recording device 14 so as to cause the recording device 14 to record an image on the thermal recording label RL attached to the container C passing through the recording device 14 at timing at which the elapsed time from the timing of receiving the detection signal is T1 and the container C reaches the recording device 14.

When receiving the recording start signal, the recording device 14 irradiates the thermal recording label RL of the container C moving relatively to the recording device 14 with laser light having certain power on the basis of the image information received from the image information output unit 47. As a result, an image is recorded on the thermal recording label RL in a non-contact manner.

Examples of the image (image information transmitted from the image information output unit 47) recorded on the thermal recording label RL include a character image such as a content of the load housed in the container C or information about a transportation destination, and the code image such as the bar code or the two-dimensional code (e.g., QR code) in which information about the content of the load housed in the container C or the transportation destination is encoded.

The container C on which the image is recorded when passing the recording device 14 passes the reading device 15. When the container C passes the reading device 15, the reading device 15 reads the code image such as the bar code or the two-dimensional code recorded on the thermal recording label RL, and acquires the information about the content of the load housed in the container C or the transportation destination. The system control device 18 compares the information acquired from the code image with the image information transmitted from the image information output unit to check whether the image is correctly recorded. When the image is correctly recorded, the system control device 18 causes the conveyance device 10 to convey the container C to the next process (e.g., a transportation preparation process).

When the image is not correctly recorded, the system control device 18 temporarily stops the conveyance device 10 and causes the operation display 181 to display that the image is not correctly recorded. When the image is not correctly recorded, the system control device 18 may cause the container C to be conveyed to a specified conveyance destination.

Figure 6A:
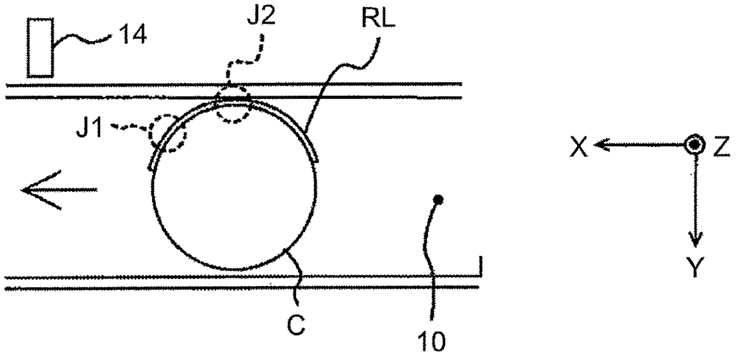
FIG. 6A is a schematic view for explaining image recording when a structural body such as a container has a cylindrical shape.
Figure 6B:
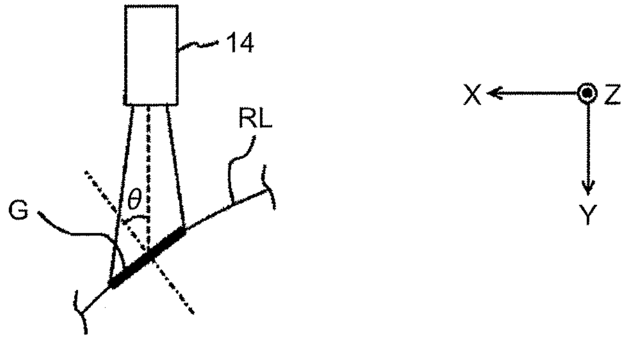
FIG. 6B is a schematic view for explaining recording an image in the vicinity of J1 in FIG. 6A.
Figure 6C:
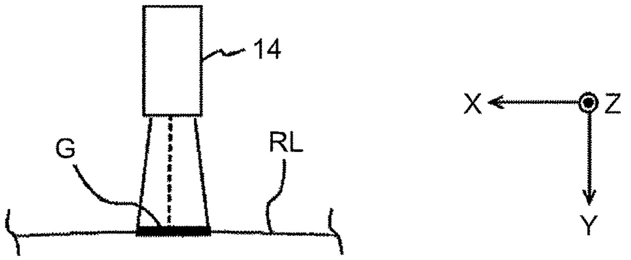
FIG. 6C is a schematic view for explaining recording an image in the vicinity of J2 in FIG. 6A.
Figure 6D:
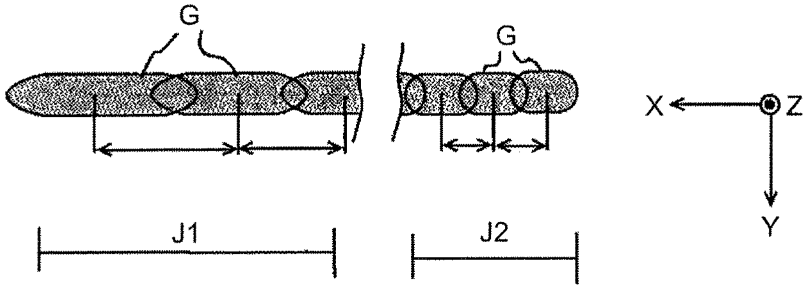
FIG. 6D is a schematic view for explaining a line drawing that is formed on the recording target illustrated in FIG. 6A and extends in an X-axis direction.

FIG. 6A is a schematic view for explaining image recording when the structural body such as the container C has a cylindrical shape. FIG. 6B is a schematic view for explaining recording an image in the vicinity of J1 in FIG. 6A. FIG. 6C is a schematic view for explaining recording an image in the vicinity of J2 in FIG. 6A. FIG. 6D is a schematic view for explaining a line drawing that is formed on the recording target illustrated in FIG. 6A and extends in the X-axis direction.

When an image is recorded on the thermal recording label RL attached to a side surface of a cylindrical shaped structural body, the recording surface on which the image is recorded is an arc-like curved surface. When the recording surface is a curved surface, an incident angle θ of laser light to the recording surface differs in the X-axis direction (sub-scanning direction) for each image recording position.

As illustrated in FIG. 6C, when the surface in the vicinity of the top J2, which is illustrated in FIG. 6A, of the recording surface having an arc-like curved surface is irradiated with laser light to record the image, the recording surface is substantially perpendicular to the laser irradiation direction (Y-axis direction). In this case, the incident angle θ of laser light to the recording surface is, thus, nearly 0°. As illustrated in FIG. 6D, an image dot G is, thus, recorded on the recording target in a specified shape and with a specified image dot pitch. As illustrated in FIG. 6B, when the surface in the vicinity of J1, which is illustrated in FIG. 6A, of the recording surface having an arc-like curved surface is irradiated with laser light to record the image, the recording surface is tilted with respect to the laser irradiation direction (Y-axis direction). In this case, the incident angle θ of laser light to the recording surface is, thus, other than 0°. As illustrated in FIG. 6D, the image dot G is, thus, recorded on the recording target in a shape stretched in the sub-scanning direction (X-axis direction) and with an image dot pitch widened in the sub-scanning direction. Such a widened pitch and a stretched image dot are observed as distortion of the recorded image when the recorded image is rotated in a circumferential direction and entirely observed from the normal direction of the recorded image. When the thermal recording label RL is peeled from the cylindrical shaped structural body and is placed flat for the observation, the recorded image is observed as a distorted image.

The embodiment adjusts a laser irradiation period, a laser irradiation time, and/or laser irradiation power to correct the distortion of the image in the sub-scanning direction (X-axis direction).

Two types of methods are available for adjusting the laser irradiation power. One is a method that controls peak power. The other is a method that controls a light emission rate (duty) of pulses. In the method that controls the peak power, a finer image can be recorded but control is difficult and it is difficult to record an image at a high speed. By contrast, in the method that controls the light emission rate, control is easier and an image can be recorded at a higher speed but recorded image quality is lower as compared with the peak power control method. Generally, either one of the method that controls the peak power and the method that controls a light emission rate of pulses is selected in accordance with a recording speed. Both methods are effective for equalizing image density.

Figure 7A:
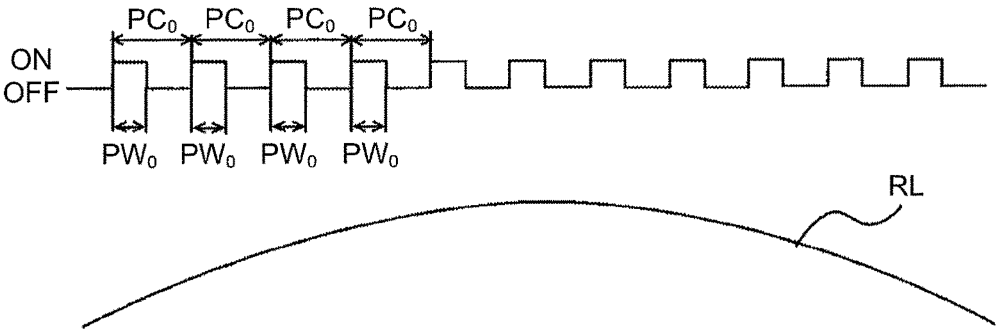
FIG. 7A is a timing chart illustrating a comparative laser irradiation period and a comparative laser irradiation time.
Figure 7B:
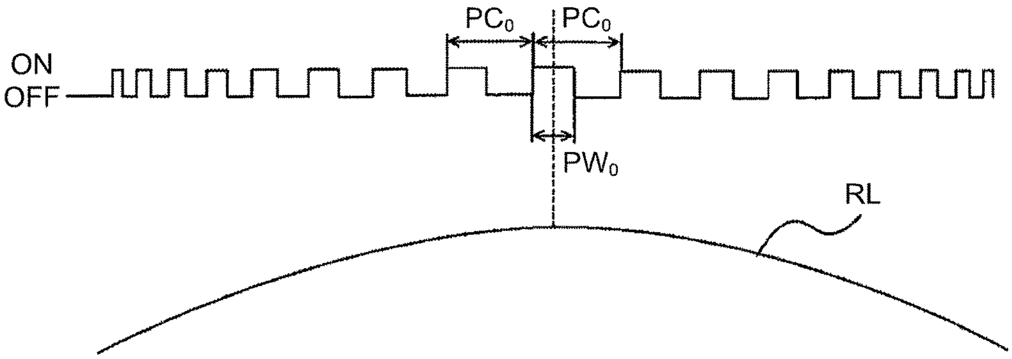
FIG. 7B is a timing chart illustrating the laser irradiation period and the laser irradiation time in the embodiment.
Figure 7C:
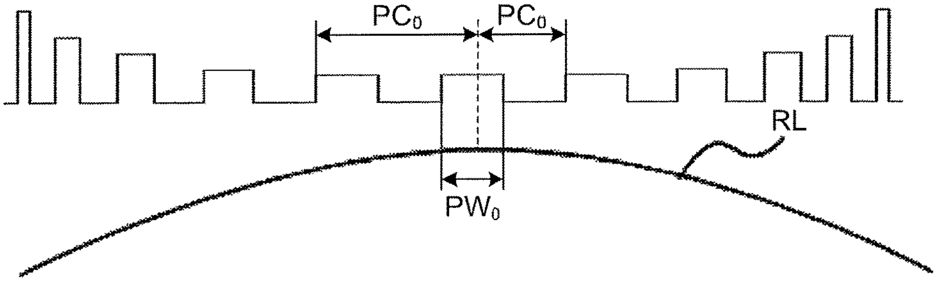
FIG. 7C is a timing chart in which laser irradiation levels at both sides are increased in addition to the timing chart illustrated in FIG. 7B.

FIG. 7A is a timing chart illustrating a comparative laser irradiation period and a comparative laser irradiation time. FIG. 7B is a timing chart illustrating the laser irradiation period and the laser irradiation time in the embodiment. FIG. 7C illustrates a timing chart in which the laser irradiation levels at both sides are increased to increase the peak power of laser light, in addition to the timing chart illustrated in FIG. 7B.

As illustrated in FIG. 7A, laser irradiation is performed in accordance with a typical laser irradiation period $PC_0$ and a typical laser irradiation time $PW_0$ regardless of the shape of the recording surface in the related art. The typical laser irradiation period $PC_0$ and the typical laser irradiation time $PW_0$ make it possible to achieve recording such that the length of the image dot in the X-axis direction is a specified length and the image dot pitch is a specified pitch when the recording surface is perpendicular to the laser irradiation direction (Y-axis direction) and the incident angle θ of laser light to the recording surface is 0°. When the recording surface is not perpendicular to the laser irradiation direction (Y-axis direction) and the incident angle θ of laser light to the recording surface is other than 0°, the length of the image dot in the sub-scanning direction becomes longer than the specified length and the image dot pitch in the sub-scanning direction is widened more than the specified pitch as illustrated in FIG. 6D. With an increase in incident angle θ of laser light to the recording surface, the length of the image dot in the sub-scanning direction becomes longer than the specified length and the image dot pitch is further widened than the specified pitch.

In contrast, in the embodiment, the laser irradiation period and the laser irradiation time are changed in accordance with the shape of the recording surface as illustrated in FIG. 7B. Specifically, as the recording surface is tilted with respect to the laser irradiation direction and the incident angle θ of laser light to the recording surface is, thus, increased, the laser irradiation time is further shortened and the laser irradiation period is further shortened. As the incident angle θ of laser light to the recording surface is increased, the laser irradiation time is further shortened, thereby making it possible to suppress the image dot from being elongated in the sub-scanning direction. As the incident angle θ of laser light to the recording surface is increased, the laser irradiation period is further shortened, thereby making it possible to suppress the image dot pitch from being widened. The embodiment, thus, can suppress the stretching and the widening of the image, thereby making it possible to suppress distortion of the image recorded on the recording surface even when the recording surface is a curved surface. In addition, the embodiment can eliminate the density reduction at both ends by employing the recording pattern illustrated in FIG. 7C, thereby making it possible to record fine images.

In addition, in the embodiment, the peak power of laser light is increased as illustrated in the timing chart in FIG. 7C in which the laser irradiation levels at both sides are increased in addition to the timing chart illustrated in FIG. 7B. As a result, energy density reduction that is caused by an increase in area of laser light irradiation due to the tilted recording surface is corrected, and energy density reduction that is caused by an increase in beam diameter due to an increase in optical path is corrected. The embodiment can eliminate the density reduction at both ends on the tilted recording surface by the laser irradiation employing the recording pattern illustrated in FIG. 7C, thereby making it possible to record fine images.

Figure 8:
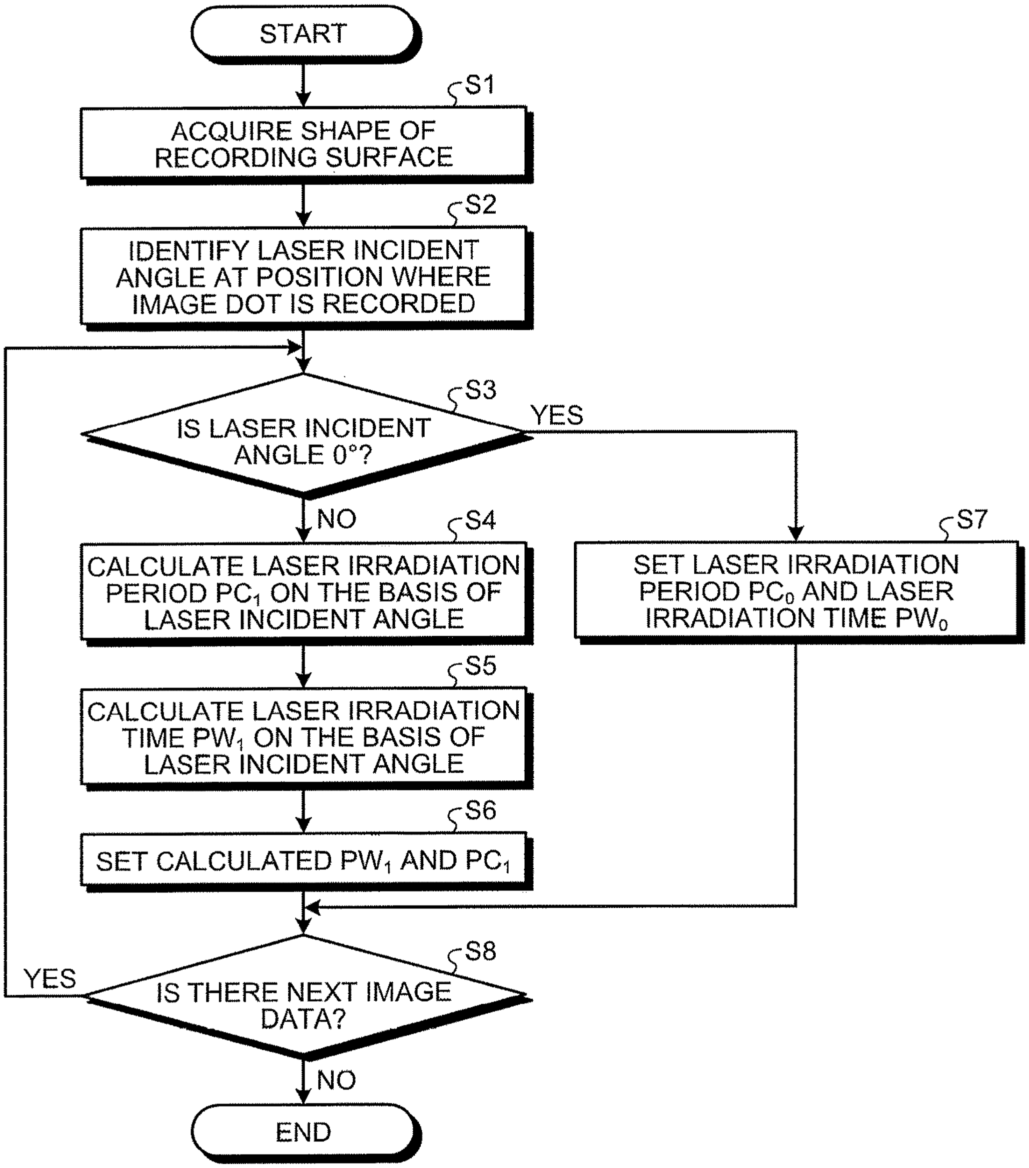
FIG. 8 is a control flow of an image distortion correction in a sub-scanning direction.

FIG. 8 is a control flow of an image distortion correction in the sub-scanning direction.

The system control device 18 serving as an image correction unit acquires the shape of the recording surface of the recording target conveyed to the recording device 14 (S1). In the embodiment, as illustrated in FIG. 1, a shape measurement sensor 182 is disposed upstream of the recording device 14 in the container conveyance direction (minus X-axis direction). The shape measurement sensor 182, which functions as a measurement unit, acquires the shape of the recording surface. For the shape measurement sensor 182, a distance sensor or a displacement sensor can be used. The shape of the recording target may be input by the operator via the operation panel 181, which functions as an input unit, and the shape of the recording surface may be acquired on the basis of the shape of the recording target input by the operator.

The system control device 18 identifies the recording position at which an image is first recorded on the recording surface in the sub-scanning direction on the basis of the image data, and identifies the laser incident angle at the recording position on the basis of the acquired shape of the recording surface (S2). If the identified laser incident angle is 0° (Yes at S3), the typical laser irradiation period $PC_0$ and the typical laser irradiation time $PW_0$ are set (S7). If the identified laser incident angle is not 0° (No at S3), a laser irradiation period $PC_1$ and a laser irradiation time $PW_1$ are calculated on the basis of the laser incident angle (S4 and S5).

The following describes the calculation of the laser irradiation time $PW_1$.

Figure 9A:
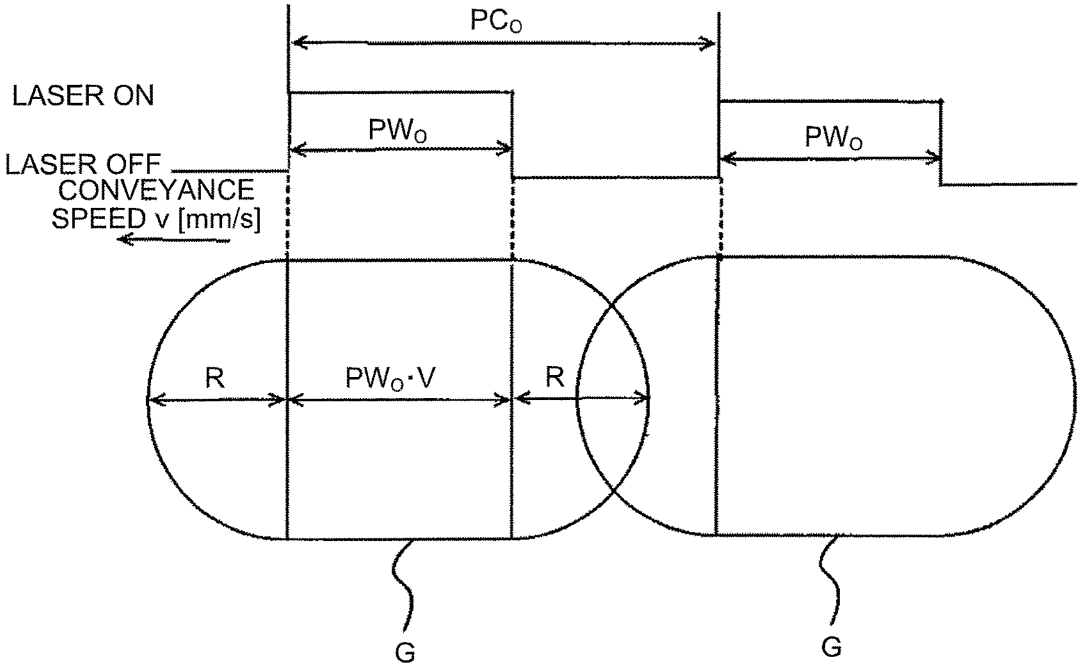
FIG. 9A is a schematic view for explaining a specified image dot G and a specified image dot pitch P1 formed by a typical laser irradiation period $PC_0$ and a typical laser irradiation time $PW_0$ when a recording surface is perpendicular to a laser irradiation direction.
Figure 9B:
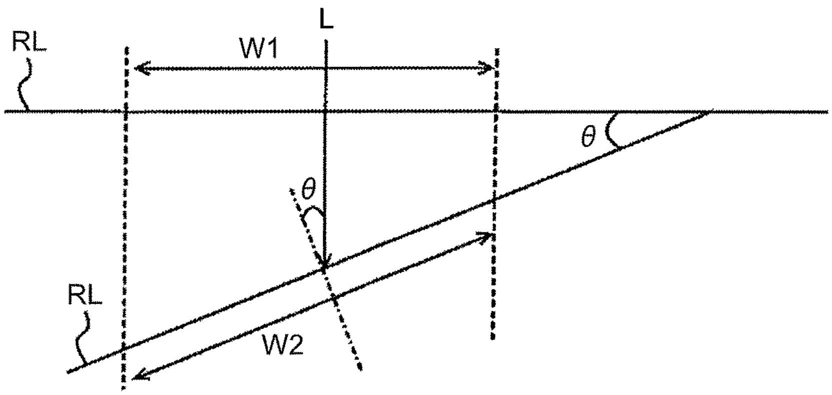
FIG. 9B is a schematic view for explaining a length of the image dot in the sub-scanning direction for each of a case where the recording surface is perpendicular to the laser irradiation direction and a case where the recording surface is tilted with respect to the laser irradiation direction.

FIG. 9A is a schematic view for explaining the specified image dot G and the specified image dot pitch P1 formed by the typical laser irradiation period $PC_0$ and the typical laser irradiation time $PW_0$ when the recording surface is perpendicular to the laser irradiation direction (the laser incident angle is 0°). FIG. 9B is a schematic view for explaining the length of the image dot in the sub-scanning direction for each of a case where the recording surface is perpendicular to the laser irradiation direction and a case where the recording surface is tilted with respect to the laser irradiation direction.

As illustrated in FIG. 9A, the image dot G has a substantially elliptical shape that is long in the X-axis direction (sub-scanning direction). More specifically, the image dot G has what is called an oval shape formed of a rectangle and two semicircles connected to both sides of the rectangle in the X-axis direction. The radius of the semicircle is R. The length of the rectangle in the X-axis direction is $PW_0 \cdot v$ where $PW_0$ is the laser irradiation time, and v is the conveyance speed of the recording target. The length of the specified image dot G in the sub-scanning direction (X-axis direction) is, thus, $2R+PW_0 \cdot v$.

As illustrated in FIG. 9B, a length W2 of the image dot in the sub-scanning direction when the thermal recording label RL (recording surface) is tilted with respect to the laser irradiation direction is larger than a length W1 of the image dot in the sub-scanning direction when the thermal recording label RL (recording surface) is perpendicular to the laser irradiation direction. A relation between W1 and W2 is expressed as $W2 \cos \theta = W1$ where θ is the incident angle of laser light L on the basis of the geometric relation illustrated in FIG. 9B. In the correction, W2 is intended to be the length of the specified image dot in the sub-scanning direction. Hence, $W2=2R+PW_0 \cdot v$ and, thus, the relation $(2R+PW_0 \cdot v) \cos \theta = W1$ holds. In addition, W1 is expressed as $W1=2R+PW_1 \cdot v$ using the laser irradiation time $PW_1$. As a result, the laser irradiation time $PW_1$ can be expressed by the following expression 1.

$$PW_1=[(2R+PW_0 \cdot v)\cos \theta - 2R]/v \quad \text{Expression 1}$$

The laser irradiation time $PW_1$ is calculated using expression 1.

The image dot pitch P1 in the sub-scanning direction (X-axis direction) is the laser irradiation period $PC_0$. A relational expression of the laser irradiation period $PC_1$ can be obtained in the same manner as the calculation of the laser irradiation time. The relational expression is expressed by the following expression 2.

$$PC_1=PC_0 \cos \theta \quad \text{Expression 2}$$

The laser irradiation period $PC_1$ is calculated using expression 2.

The radius R of the semicircle portion of the image dot is obtained by a preliminary experiment.

Figure 10:
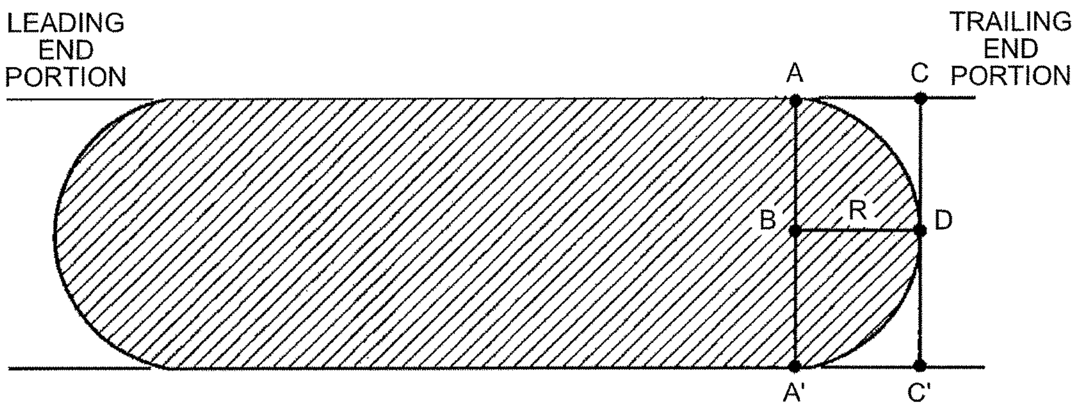
FIG. 10 is a schematic view for explaining how to obtain a radius R of a semicircle portion of the image dot G.

FIG. 10 is a schematic view for explaining how to obtain the radius R of the semicircle portion of the image dot G.

On the recording target, a line that has a width of one dot in the Z-axis direction (main-scanning direction) is recorded. The image density is measured by a micro densitometer (with a slit width of 5 μm). An average density is calculated from a maximum and a minimum of the density measurement result, takes out a contour of the average density, and magnifies the contour 500 times. The inter section A of one end of the line in the Z-axis direction (main-scanning direction) and the arc at one end of the line in the X-axis direction (sub-scanning direction), and the intersection A' of the other end of the line in the Z-axis direction (main-scanning direction) and the arc at the one end of the line in the X-axis direction (sub-scanning direction) are obtained. The midpoint B of the line A-A' is obtained. The line C-C' that is in parallel with the line A-A' and touches the arc is obtained. The tangent point D of the line C-C' and the arc is obtained. The length from the midpoint B to the tangent point D is obtained as the radius R of the semi circle portion of the image dot G.

Referring back to FIG. 8, after calculating the laser irradiation period $PC_1$ using expression 1 and the laser irradiation time $PW_1$ using expression 2, the system control device 18 sets the calculated laser irradiation period $PC_1$ and laser irradiation time $PW_1$ (S6). When an image is first recorded in the sub-scanning direction on the recording surface, only the laser irradiation time is set. The system control device 18 returns to S3 if there is the next image data (Yes at S8) after the processing in S6 or S7 is finished. Further, the system control device 18 finishes the processing if there is not the next image data (No at S8) after the processing in S6 or S7 is finished.

The laser irradiation period $PC_1$ and the laser irradiation time $PW_1$ are set to each recording position on the recording surface in the sub-scanning direction (X-axis direction) to produce a profile of the laser irradiation as illustrated in FIG. 7B. When the laser irradiation period $PC_1$ and the laser irradiation time $PW_1$ are set to the last recording position in the sub-scanning direction, the processing ends.

On the basis of the profile of the laser irradiation thus produced, the laser irradiation period (timing of starting the laser irradiation) and the laser irradiation time are controlled. Specifically, the controller 46 includes the clock generator as described above. When the number of clocks generated by the clock generator reaches the specified number of clocks, laser irradiation starts or ends. The laser irradiation period and the laser irradiation time, thus, can be controlled by changing the specified number of clocks to start laser irradiation and the specified number of clocks to end laser irradiation. The laser irradiation period and the laser irradiation time are controlled on the basis of the produced profile of the laser irradiation as described above, thereby making it possible to correct distortion of the image in the sub-scanning direction and to obtain a good image in which the image distortion is suppressed even when the recording surface is a curved surface.

As described above, the laser irradiation time $PW_1$ is calculated for each recording position on the recording surface. The laser irradiation time $PW_1$, however, can suppress the stretching of the image well when satisfying the relation $0.8[(2R+PW_0 \cdot v)\cos \theta - 2R]/v \le PW_1 \le 1.3[(2R+PW_0 \cdot v)\cos \theta - 2R]/v$. The laser irradiation period $PC_1$ can also well suppress the widening of the image dot when satisfying the relation $0.8\, PC_0 \cos \theta \le PC_1 \le 1.3\, PC_0 \cos \theta$. For example, the laser irradiation time $PW_1$ and the laser irradiation period $PC_1$ may be calculated for the recording position where an image is first recorded on the recording surface in the sub-scanning direction on the basis of the laser incident angle, and thereafter the laser incident angle may be checked for each recording position. When a difference between the checked laser incident angle and the laser incident angle at the calculation is within a specified range, and the laser irradiation time $PW_1$ satisfies $0.8[(2R+PW_0 \cdot v) \cos \theta-2R]/v \leq PW_1 \leq 1.3[(2R+PW_0 \cdot v)\cos \theta-2R]/v$ and the laser irradiation period $PC_1$ satisfies $0.8 PC_0 \cos \theta \leq PC_1 \leq 1.3 PC_0 \cos \theta$, the first calculated laser irradiation time $PW_1$ and laser irradiation period $PC_1$ may be set without calculating the laser irradiation time $PW_1$ and the laser irradiation period $PC_1$. When the difference between the checked laser incident angle and the laser incident angle at the calculation exceeds the specified range and those relations are not satisfied, the laser irradiation time $PW_1$ and the laser irradiation period $PC_1$ may be calculated.

A range of the laser incident angle is separated such that the laser irradiation time $PW_1$ satisfies $0.8[(2R+PW_0 \cdot v)\cos \theta-2R]/v \leq PW_1 \leq 1.3[(2R+PW_0 \cdot v)\cos \theta-2R]/v$ and the laser irradiation period $PC_1$ satisfies $0.8 PC_0 \cos \theta \leq PC_1 \leq 1.3 PC_0 \cos \theta$, a table is stored in the non-volatile memory in which the separated laser incident angle, the laser irradiation time $PW_1$, and the laser irradiation period $PC_1$ are in association with one another. The laser irradiation time $PW_1$ and the laser irradiation period $PC_1$ may be set for each recording position on the basis of the laser incident angle identified based on the acquired shape of the recording surface.

When the recording surface has a curved shape in the main-scanning direction such as a case where the recording surface of the recording target is curved in the main-scanning direction (Z-axis direction), the image recorded on the recording target is distorted in the main-scanning direction. The image distortion in the main-scanning direction (Z-axis direction) cannot be corrected by the laser irradiation period and the laser irradiation time unlike the image distortion in the sub-scanning direction (X-axis direction). The image distortion in the main-scanning direction (Z-axis direction) is corrected as follows: the image data output from the image information output unit 47 is converted, and the image is recorded on the recording target on the basis of the converted image data. Specifically, the size of the image data in the main-scanning direction is reduced on the basis of the acquired shape of the recording surface.

The following describes an exemplary correction of the image distortion in the main-scanning direction. On the basis of the image data transmitted from the image information output unit 47, a main-scanning direction length F1 of the image when the recording surface is a plane perpendicular to the laser output direction is obtained. On the basis of the shape of the recording surface acquired by the shape measurement sensor 182 and the image data, a main-scanning direction length F2 of the image when the image is recorded on the recording surface is obtained, in the same manner as described above. The main-scanning direction length F1 is subtracted from the main-scanning direction length F2 to grasp the amount of increase of the recorded image in the main-scanning direction, and the number of pixels to be decimated from the image data is specified. The pixels are decimated from the image data on the basis of a certain algorithm to reduce the size of the image data in the main-scanning direction. The pixels are decimated in such a manner that when the certain number of black dots (image data is "one") or white dots (image data is "zero") continue in the main-scanning direction, the pixels are decimated from the continuous dots, for example. On the basis of the converted image data, the image is recorded on the recording surface. As a result, the image in which the distortion in the main-scanning direction is corrected can be recorded on the recording surface.

When the recording surface has a shape with respect to which the laser incident angle changes both in the main-scanning direction (Z-axis direction) and the sub-scanning direction (X-axis direction) such as a case where the recording surface is a spherical surface, both of the distortion correction in the sub-scanning direction and the distortion correction in the main-scanning direction that are described above are performed, and the image is recorded on the recording surface. As a result, the image in which the distortion is suppressed both in the main-scanning direction and the sub-scanning direction can be recorded on the recording surface.

The following describes a verification experiment carried out by the inventor.

Working Example 1

Figure 11:
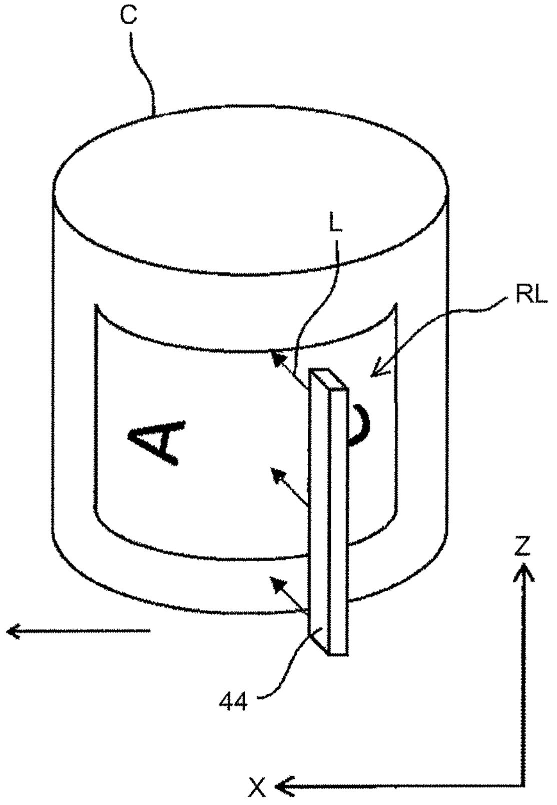
FIG. 11 is a schematic view illustrating working example 1.

FIG. 11 is a schematic view illustrating working example 1. In working example 1, the container C that is the cylindrically shaped structural body having the thermal recording label RL attached to the side surface thereof was prepared as the recording target. On the basis of the shape of the structural body, the incident angle of laser light entering the surface of the thermal recording label RL serving as the recording surface was obtained for each position in the X-axis direction (sub-scanning direction). The recording target was set such that the recording target stands vertically. The images of "A", "B", and "C" were recorded on the recording target while the recording target was conveyed at the constant speed v and pulses of laser were controlled such that $PW_1=[(2R+PW_0 \cdot v)\cos \theta-2R]/v$ and $PC_1=PC_0 \cos \theta$ were satisfied for each of the obtained laser incident angles. The various parameters were set as follows: the pitch between laser light centers=0.126 mm, R=0.064 mm, the laser irradiation period (frequency) PC=125 μsec (8 kHz), the laser irradiation time PW=93 μsec, the conveyance speed=1 m/s, and the peak power=3 W.

Working Example 2

Figure 12:
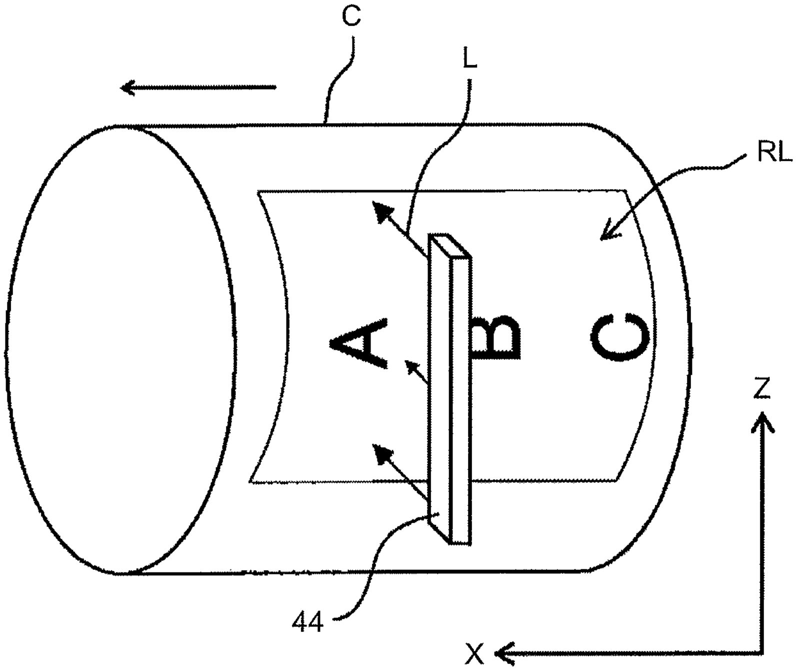
FIG. 12 is a schematic view illustrating working example 2.

FIG. 12 is a schematic view illustrating working example 2. In working example 2, the recording target subjected to working example 1 was set horizontally. The images of "A", "B", and "C" were recorded on the recording target while the recording target was conveyed at the constant speed. In working example 2, the image data of the images of "A", "B", and "C" to be recorded on the recording target was converted on the basis of the shape of the container C serving as the structural body, and the images of "A", "B", and "C" were recorded on the recording target on the basis of the converted image data.

Working Example 3

In the working example 3, the control was performed in the same manner as working example 1 except for that the peak power of laser light was corrected as power control. In the power correction, the peak power at the position where the incident angle θ is 0° was 3 W, which is the same as in working example 1, and the peak power was increased to 4 W as the incident angle θ was increased and the optical path became longer.

Working Example 4

In the working example 4, the control is performed in the same manner as working example 2 except for that the peak power of laser light was corrected as power control. In the power correction, the peak power at the position where the incident angle θ is 0° was 3 W, which is the same as in working example 1, and the peak power was increased to 4 W as the incident angle θ was increased and the optical path became longer.

Comparative Example

The comparative example was conducted in the same manner as working example 1 except for that the laser irradiation time was constant to be $PW_0$ and the laser irradiation period was constant to be $PC_0$.

The thermal recording labels RL on which the images had been recorded in working examples 1 and 2 and the comparative example were peeled from the respective structural bodies, placed flat, and visually observed from the front side thereof to evaluate levels of the distortion of images. The results are illustrated in Table 1. When the image distortion was equal to or better than a permissible level, the result is indicated as "good". When the image distortion was noticeable and the image distortion was an impermissible level, the result is indicated as "poor". The results are illustrated in Table 1. When the image density change was equal to or better than a permissible level, the result is indicated as "good". When the image density change was observed, the result is indicated as "fair". When the image density change was an impermissible level, the result is indicated as "poor". The results are illustrated in Table 1.

TABLE 1

| | Image distortion | Image density change |
|---|---|---|
| Working example 1 | good | fair |
| Working example 2 | good | fair |
| Working example 3 | good | good |
| Working example 4 | good | good |
| Comparative example | poor | poor |

As can be seen from Table 1, the image distortion could be reduced in a permissible range by performing the laser pulse control on the basis of the incident angle of laser to the recording surface and the conversion on the image data on the basis of the shape of the recording surface.

First Modification

Figure 13A:
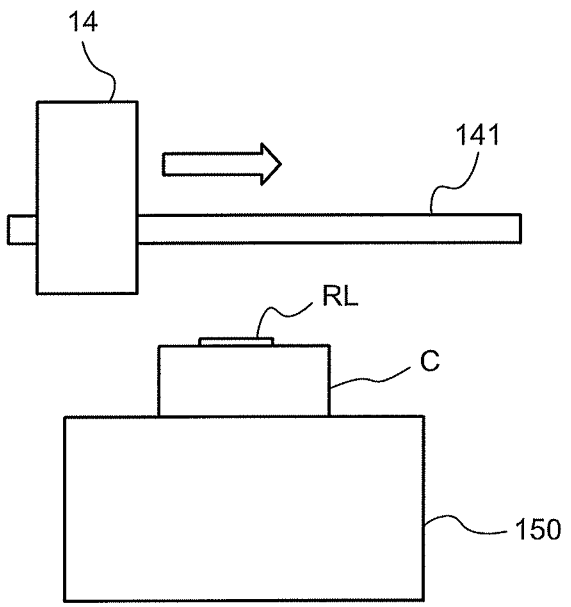
FIGS. 13A and 13B are schematic views illustrating an example of the image recording system in a first modification.
Figure 13B:
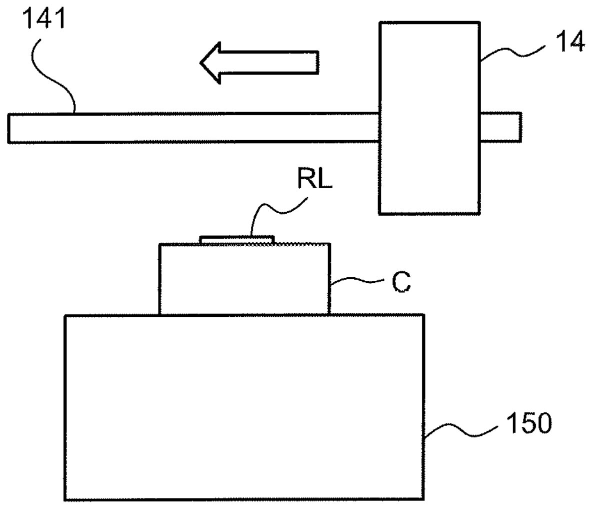

FIGS. 13A and 13B are schematic views illustrating an example of the image recording system 100 in a first modification. In the first modification, the recording device 14 moves and records an image on the thermal recording label RL of the container C serving as the recording target.

As illustrated in FIGS. 13A and 13B, the image recording system 100 in the first modification includes a placement table 150 on which the container C is placed. The recording device 14 is supported by a rail member 141 such that the recording device is movable in the left-right direction in FIGS. 13A and 13B.

In the first modification, the operator sets the container C on the placement table 150 such that the surface to which the thermal recording label RL of the container C serving as the recording target is attached faces upward. After setting the container C on the placement table 150, the operator operates the operation panel 181 to start the image recording processing. When the image recording processing starts, the recording device 14 located on the left side in FIG. 13A moves to the right side in FIG. 13A as indicated with the arrow. The recording device 14 irradiates the recording target (the thermal recording level RL on the container C) with laser light while moving to the right side in FIG. 13A to record an image on the recording target. After the image is recorded, the recording device 14 at the right side in FIG. 13 B moves to the left side as indicated with the arrow in FIG. 13B and returns to the position illustrated in FIG. 13A.

The examples are described above in each of which the invention is applied to the device that records the image on the thermal recording label RL attached to the container C. The invention may be applied to an image rewriting system that rewrites the image on a reversible thermal recording label attached to the container C, for example. In this case, an erasing device that irradiates the reversible thermal recording label with a laser to erases the image recorded on the reversible thermal recording label is disposed upstream of the recording device 14 in the conveyance direction of the container. After the image recorded on the reversible thermal recording label is erased by the erasing device, the recording device 14 records an image on the reversible thermal recording label. The recording device 14 can also suppress distortion of the image recorded on the recording surface having a curved surface.

The recording device using the fiber array is described above. The recording device may use semiconductor lasers arranged in an array with a pixel pitch and irradiate the recording target with laser light from the semiconductor lasers without optical fibers for transmitting laser light, thereby recording an image on the recording target.

The above descriptions are represented by way of example. The invention has particular advantages in the following aspects.

First Aspect

An image recording apparatus according to a first aspect includes a laser irradiation device that is provided with a plurality of laser output sections arranged side by side in a certain direction and irradiates positions different from one another in the certain direction with laser light output from the laser output sections, and irradiates a recording target moving relatively to the laser irradiation device in a direction different from the certain direction with laser light, thereby heating the recording target to record a visible image. The image recording apparatus includes an image correction unit such as the system control device 18 that adjusts an irradiation condition of the laser light output from the laser output sections and corrects distortion of the image recorded on the recording surface on the basis of a shape of the recording surface of the recording target.

When the image recording surface is a curved surface, the image recorded on the recording surface is distorted. The reasons are as follows. When the recording surface is a curved surface, the recording surface is tilted with respect to the laser irradiation direction. As a result, an incident angle of a laser to the recording surface is other than 0°. When the laser incident angle is other than 0°, a position irradiated with the laser and a range irradiated with the laser differ from when the laser incident angle is 0°. As a result, an image dot formed on the recording surface is stretched in the tilted direction and an image dot pitch is widened. As the recording surface is tilted and the laser incident angle is increased, the image dot is further stretched in the tilted direction and the image dot pitch is further widened. The stretched image dot and the widened image dot pitch appear as distortions of the image recorded on the recording surface.

The image recording apparatus according to the first aspect, thus, corrects the distortion of the image recorded on the recording surface on the basis of the shape of the recording surface of the recording target. When the recording surface is tilted in the sub-scanning direction, the stretching of the image dot formed on the recording surface in the sub-scanning direction can be suppressed by shortening a laser irradiation time, for example. The widening of the image dot pitch can be suppressed by shortening a laser irradiation period. As a result, the image distortion in the sub-scanning direction can be suppressed.

When the recording surface is tilted in the main-scanning direction, the size of image data is corrected into a reduced size in the main-scanning direction to correct the image distortion in the main-scanning direction, thereby making it possible to suppress the distortion of the image recorded on the recording surface.

As described above, the image recording apparatus according to the first aspect can correct the image distortion by adjusting the laser irradiation conditions and converting the image data in accordance with the shape of the recording surface, thereby making it possible to suppress the distortion of the image recorded on the recording surface.

Second Aspect

In the image recording apparatus according to the first aspect, the image correction unit such as the system control device 18 adjusts the irradiation condition on the basis of the incident angle of the laser light to the recording surface of the recording target in the relative movement direction of the recording target.

As described in the embodiment, the image recording apparatus according to the second aspect can suppress the widening of the image dot pitch in the relative movement direction of the recording target and the stretching of the image dot in the relative movement direction of the recording target by adjusting the laser irradiation conditions such as the laser irradiation period and the laser irradiation time in accordance with the incident angle of the laser to the recording surface, thereby making it possible to correct the image distortion in the relative movement direction of the recording target.

Third Aspect

In the image recording apparatus according to the second aspect, the image correction unit such as the system control device 18 adjusts, as the irradiation condition, at least one of the laser irradiation time and the laser irradiation period on the basis of the incident angle.

As described in the embodiment, the image recording apparatus according to the third aspect can adjust at least one of the stretching of the image dot and the widening of the image dot pitch in the relative movement direction of the recording target, thereby making it possible to correct the image distortion in the relative movement direction of the recording target.

Fourth Aspect

In the image recording apparatus according to the third aspect, the image correction unit such as the system control device 18 adjusts, as the irradiation condition, the laser irradiation time and the laser irradiation period on the basis of the incident angle.

As described in the embodiment, the image recording apparatus according to the fourth aspect can suppress both of the stretching of the image dot and the widening of the image dot pitch by adjusting both of the laser irradiation time and the laser irradiation period on the basis of the incident angle, thereby making it possible to correct well the image distortion in the relative movement direction of the recording target.

Fifth Aspect

In the image recording apparatus according to the third aspect or the fourth aspect, the image correction unit such as the system control device 18 adjusts the laser irradiation time such that the laser irradiation time $PW_1$ at a time when the incident angle is θ satisfies the relation $$0.8[(2R+PW_0\cdot v)\cos\theta-2R]/v \le PW_1 \le 1.3[(2R+PW_0\cdot v)\cos\theta-2R]/v$$

where $PW_0$ is the laser irradiation time at a time when the incident angle is 0°, R is the diameter of the image dot, and v is the relative movement speed of the recording target.

As described in the embodiment, the image recording apparatus according to the fifth aspect can suppress the stretching of the image dot by adjusting the laser irradiation time within the range described above, thereby making it possible to suppress the image distortion.

Sixth Aspect

In the image recording apparatus according to any of the third aspect to the fifth aspect, the image correction unit such as the system control device 18 adjusts the laser irradiation period such that the laser irradiation period $PC_0$ at a time when the incident angle is θ satisfies the relation $0.8\ PC_0\cos\theta \le PC_1 \le 1.3\ PC_0\cos\theta$ where $PC_0$ is the laser irradiation period at a time when the incident angle is 0°.

As described in the embodiment, the image recording apparatus according to the sixth aspect can suppress the position shift of the image dot by adjusting the laser irradiation period within the range described above, thereby making it possible to suppress the image distortion.

Seventh Aspect

In the image recording apparatus according to any of the first aspect to the sixth aspect, the image correction unit such as the system control device 18 changes the size of the image data in the main-scanning direction on the basis of the shape of the recording surface in the direction perpendicular to the relative movement direction of the recording target.

As a result, the image recording apparatus according to the seventh aspect can suppress the image distortion in the main-scanning direction.

Eighth Aspect

The image recording apparatus according to any of the first aspect to the seventh aspect includes an input unit such as the operation panel 181 through which information about the shape of the recording surface is input.

As described in the embodiment, the image recording apparatus according to the eighth aspect can acquire the shape of the recording surface from the information input by the user thereof.

Ninth Aspect

The image recording apparatus according to any of the first aspect to the eighth aspect includes a shape measurement unit such as the shape measurement sensor 182 that measures the shape of the recording surface.

The image recording apparatus according to the ninth aspect measures the shape of the recording surface, thereby making it possible to accurately grasp the shape of the recording surface.

Tenth Aspect

In the image recording apparatus according to any of the first aspect to the ninth aspect, the image correction unit such as the system control device 18 controls irradiation power of the laser light on the basis of the shape of the recording surface of the recording target.

As a result, the image recording apparatus according to the tenth aspect can suppress the image formed on the recording surface.

Eleventh Aspect

In the image recording apparatus according to any of the first aspect to the tenth aspect, the laser irradiation device includes a plurality of laser light emitting elements, and a plurality of optical fibers each provided to correspond to one of the laser light emitting elements and each guide laser light emitted from the laser light emitting element to the recording target, and laser output sections of the respective optical fibers are held in an array in the certain direction in a laser array.

As described in the embodiment, the image recording apparatus according to the eleventh aspect allows the laser output sections of the respective optical fibers to be arranged with the same pitch as a pixel pitch of the visible image and does not need to arrange the laser light emitting elements such as the semiconductor lasers with the same pitch as the pixel pitch. The laser light emitting elements, thus, can be arranged such that heat of the laser light emitting elements is released. As a result, an increase in temperature of the laser light emitting elements can be suppressed. The image recording apparatus according to the eleventh aspect can suppress the fluctuation in wavelength and light output of the laser light emitting elements, thereby making it possible to record a good image on the recording target.

Twelfth Aspect

In the image recording apparatus according to the eleventh aspect, the image correction unit such as the system control device 18 controls irradiation power of the laser light in accordance with temperature of laser light emitting elements.

The image recording apparatus according to the twelfth aspect can correct and suppress the fluctuation in light output of the laser light emitting elements due to the temperature thereof, thereby making it possible to record a good image on the recording target.

Thirteenth Aspect

The image recording apparatus according to any of the first aspect to the twelfth aspect includes a recording target conveyance unit such as the conveyance device 10 that conveys the recording target, and irradiates the recording target with laser light while conveying the recording target by the recording target conveyance unit to record a visible image on the recording target.

The image recording apparatus according to the thirteenth aspect can further enhance productivity than a case where the recording target is temporarily stopped and the laser irradiation unit such as the recording device 14 is moved to record the visible image on the recording target.

Fourteenth Aspect

An image recording method performs image recording on a recording target using the image recording apparatus according to any of the first aspect to the thirteenth aspect.

The image recording method can record an image in which distortion is suppressed on the recording surface having a curved surface.

An embodiment provides an advantageous effect that an image in which distortion is suppressed can be recorded on the recording target having a curved surface.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image recording apparatus comprising:

a laser irradiation device including a plurality of laser output sections arranged side by side in a certain direction and configured to irradiate positions different from one another in the certain direction with laser light output from the plurality of laser output sections, the image recording apparatus being configured to irradiate a recording target moving relatively to the laser irradiation device in a relative movement direction different from the certain direction, with laser light to heat the recording target, and record a visible image on the recording target; and an image correction unit configured to adjust an irradiation condition of the laser light output from the plurality of laser output sections and correct distortion of an image recorded on a recording surface of the recording target based on a shape of the recording surface, wherein the image correction unit is configured to adjust the irradiation condition based on an incident angle of the laser light to the recording surface of the recording target in the relative movement direction of the recording target, wherein the image correction unit is configured to adjust, as the irradiation condition, at least one of a laser irradiation time and a laser irradiation period, based on the incident angle, and wherein the image correction unit is configured to adjust the laser irradiation time such that a laser irradiation time $PW_1$ at a time when the incident angle is θ satisfies a relation $0.8[(2R+PW_0 \cdot v)\cos\theta-2R]/v \leq PW_1 \leq 1.3[(2R+PW_0 \cdot v)\cos\theta-2R]/v$ where $PW_0$ is a laser irradiation time at a time when the incident angle is 0°, R is a diameter of an image dot, and v is a relative movement speed of the recording target.

2. The image recording apparatus according to claim 1, wherein the image correction unit is configured to adjust, as the irradiation condition, the laser irradiation time and the laser irradiation period based on the incident angle.

3. An image recording apparatus comprising:

a laser irradiation device including a plurality of laser output sections arranged side by side in a certain direction and configured to irradiate positions different from one another in the certain direction with laser light output from the plurality of laser output sections, the image recording apparatus being configured to irradiate a recording target moving relatively to the laser irradiation device in a relative movement direction different from the certain direction, with laser light to heat the recording target, and record a visible image on the recording target; and an image correction unit configured to adjust an irradiation condition of the laser light output from the plurality of laser output sections and correct distortion of an image recorded on a recording surface of the recording target based on a shape of the recording surface, wherein the image correction unit is configured to adjust the irradiation condition based on an incident angle of the laser light to the recording surface of the recording target in the relative movement direction of the recording target, wherein the image correction unit is configured to adjust, as the irradiation condition, at least one of a laser irradiation time and a laser irradiation period, based on the incident angle, and wherein the image correction unit is configured to adjust the laser irradiation period such that a laser irradiation period $PC_1$ at a time when the incident angle is 0 satisfies a relation $0.8\ PC_0 \cos\theta \leq PC_1 \leq 1.3 PC_0 \cos\theta$ where $PC_0$ is a laser irradiation period at a time when the incident angle is 0°.

4. The image recording apparatus according to claim 1, wherein the image correction unit is configured to change a size of image data in a main-scanning direction based on a shape of the recording surface in a direction perpendicular to the relative movement direction of the recording target.

5. The image recording apparatus according to claim 1, further comprising an input unit configured such that information about the shape of the recording surface is input through the input unit.

6. The image recording apparatus according to claim 1, further comprising a measurement unit configured to measure the shape of the recording surface.

7. The image recording apparatus according to claim 1, wherein the image correction unit is configured to control irradiation power of the laser light based on the shape of the recording surface of the recording target.

8. The image recording apparatus according to claim 1, wherein the laser irradiation device comprises:

a plurality of laser light emitting elements; and a plurality of optical fibers provided to correspond to the plurality of laser light emitting elements, and configured to guide laser light emitted from the plurality of laser light emitting elements to the recording target, and a plurality of laser output sections of the plurality of optical fibers are held in an array in the certain direction in a laser array.

9. The image recording apparatus according to claim 8, wherein the image correction unit is configured to control irradiation power of the laser light in accordance with a temperature of the plurality of laser light emitting elements.

10. The image recording apparatus according to claim 1, further comprising a recording target conveyance unit configured to convey the recording target, wherein the image recording apparatus is configured to irradiate the recording target with laser light to record a visible image while the recording target is conveyed by the recording target conveyance unit.

11. An image recording method for performing image recording on a recording target using an image recording apparatus, wherein the image recording apparatus according to claim 1 is used as the image recording apparatus.

12. The image recording apparatus according to claim 3, wherein the image correction unit is configured to change a size of image data in a main-scanning direction based on a shape of the recording surface in a direction perpendicular to the relative movement direction of the recording target.

13. The image recording apparatus according to claim 3, further comprising an input unit configured such that information about the shape of the recording surface is input through the input unit.

14. The image recording apparatus according to claim 3, further comprising a measurement unit configured to measure the shape of the recording surface.

15. The image recording apparatus according to claim 3, wherein the image correction unit is configured to control irradiation power of the laser light based on the shape of the recording surface of the recording target.

16. The image recording apparatus according to claim 3, wherein the laser irradiation device comprises:

a plurality of laser light emitting elements; and a plurality of optical fibers provided to correspond to the plurality of laser light emitting elements, and configured to guide laser light emitted from the plurality of laser light emitting elements to the recording target, and a plurality of laser output sections of the plurality of optical fibers are held in an array in the certain direction in a laser array.

17. The image recording apparatus according to claim 16, wherein the image correction unit is configured to control irradiation power of the laser light in accordance with a temperature of the plurality of laser light emitting elements.

18. The image recording apparatus according to claim 3, further comprising a recording target conveyance unit configured to convey the recording target, wherein the image recording apparatus is configured to irradiate the recording target with laser light to record a visible image while the recording target is conveyed by the recording target conveyance unit.

19. An image recording method for performing image recording on a recording target using an image recording apparatus, wherein the image recording apparatus according to claim 3 is used as the image recording apparatus.

* * * * *